UNITED STATES PATENT OFFICE.

BYRON M. PICKETT, OF NEW YORK, N. Y., ASSIGNOR TO THE NEW PROCESS STEEL HARDENING COMPANY, OF PORTLAND, MAINE.

PROCESS OF AND COMPOSITION FOR TEMPERING.

SPECIFICATION forming part of Letters Patent No. 437,794, dated October 7, 1890.

Application filed March 3, 1890. Serial No. 342,442. (No specimens.)

*To all whom it may concern:*

Be it known that I, BYRON M. PICKETT, of the city and State of New York, have invented certain Improvements in Tempering-Fluids for Treating Steel, of which the following is a specification.

This invention consists of the mixture of a diluent—such as water or oil—with a metallic ingredient containing an oxide or a carbonate or both an oxide and a carbonate of iron or other metal of the so-called "iron group"—to wit, manganese, cobalt, or nickel—and a combustible organic substance which is soluble in water, such as glucose. The said mixture may be prepared in a variety of ways. Thus the metallic and organic ingredients and the diluent may be mixed together at one operation, or the metallic and organic ingredient may be first compounded together, either with or without the employment of heat, and the diluent afterward added. The latter method is preferred for reasons of convenience and effectiveness.

In compounding the metallic and organic ingredients they may be simply mixed together at atmospheric temperature in any suitable vessel, or they may be subjected to various degrees of heat either during or after the process of mixing. The degree of heat employed may be less than is required to cause the ignition of the organic substance; but it is preferred that it should be sufficient to cause such ignition, which should be allowed to continue for a short time, when the flame should be smothered while the mass still retains a pasty condition and before the whole of the organic substance is consumed. While the mass is being heated it should be thoroughly stirred. By the employment of heat in preparing the compound its effectiveness when mixed with the diluent is largely increased, and it is made still more effective by the ignition of the organic substance.

When a carbonate is employed in the compound, by the application of heat a portion of it is converted into an oxide, and if the heat is sufficiently high and the application is of sufficient duration the conversion may be complete; but whether in the resultant mixture the metallic ingredient is wholly a carbonate, or partly a carbonate and partly an oxide, or wholly an oxide it is in any case effective for the purpose, and it is claimed as the invention herein described.

The proportions of the metallic and organic ingredients which are deemed most effective are one part, by weight, of the metallic ingredient to two parts of the organic ingredient, though considerable variation can be made from these proportions without materially impairing the efficiency of the compound. The diluent is added in the proportion, say, of two gallons of the diluent to each ounce of the compound, and the fluid is then ready for use. The presence of a very small quantity of the compound in the hardening-bath produces a sensible effect upon the steel treated in it, which effect appears to be increased about in proportion to the quantity of compound used until the proportion of one ounce of the compound to two gallons of the diluent is reached, beyond which point the addition of more of the compound does not usually appear to produce any increased effect upon the metal.

In practice the steel to be treated is usually heated until it presents a dull-red appearance in a moderately dark place, and is then at once plunged into the tempering-fluid. Better results will be attained if the fluid is agitated when used, so as to cause a thorough mixture of the ingredients. After the steel is hardened in the fluid the temper may be "drawn" in the usual manner. It will be found that steel so treated will be hardened to much more than the usual depth, and that it will possess a remarkable degree of tensile strength and toughness as compared with that treated by the usual methods of hardening. A lower degree of heat than is usually employed can be used in hardening by this method, whereby injury to the metal is avoided.

Carbonates or oxides of manganese, cobalt, or nickel may be substituted for the carbonate or oxide of iron; but the latter are preferable for their effectiveness, and also for reasons of economy.

A variety of combustible organic substances which are soluble in water—such as dextrine, glycerine, molasses, honey, starch paste, &c.—may be used as substitutes for the glucose; but the latter is found to be especially effective.

What is claimed as the invention is—

1. A tempering-fluid for treating steel, the same consisting of water or oil as a diluent, a metallic ingredient containing an oxide or a carbonate of a metal of the so-called "iron group," and a combustible organic substance which is soluble in water, such as glucose, substantially as set forth.

2. The herein-described method of preparing a tempering-fluid for treating steel, which consists in mixing together a metallic ingredient, such as an oxide or a carbonate of a metal of the so-called "iron group," and a combustible organic substance which is soluble in water, such as glucose, igniting the organic substance, and allowing it to burn for a short time, but not until it is wholly consumed, and adding to the compound thus formed a diluent, such as oil or water, substantially in the proportions specified.

3. The herein-described process for treating steel, which consists in heating it to a red heat and then plunging it into a previously-prepared bath composed of a diluent, such as water or oil, a metallic ingredient containing an oxide or carbonate of a metal of the so-called "iron group," and a combustible organic substance which is soluble in water, such as glucose.

BYRON M. PICKETT.

Witnesses:
EDMUND TWEEDY,
WM. E. QUIMBY.